United States Patent
Rahiman et al.

(10) Patent No.: US 12,457,098 B2
(45) Date of Patent: Oct. 28, 2025

(54) SPDM-BASED FIRMWARE PROTECTION SYSTEM AND METHOD

(71) Applicant: Dell Products, L.P., Round Rock, TX (US)

(72) Inventors: Shinose Abdul Rahiman, Bangalore (IN); Rama Rao Bisa, Bangalore (IN); Dharma Bhushan Ramaiah, Bangalore (IN); Vineeth Radhakrishnan, Palakkad (IN); Mini Thottunkal Thankappan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 281 days.

(21) Appl. No.: 18/174,137

(22) Filed: Feb. 24, 2023

(65) Prior Publication Data

US 2024/0291636 A1 Aug. 29, 2024

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3263* (2013.01)

(58) Field of Classification Search
None
See application file for complete search history.

(56) References Cited

U.S. PATENT DOCUMENTS

2024/0281538 A1\* 8/2024 Radhakrishnan ....... G06F 21/57

FOREIGN PATENT DOCUMENTS

CN 116028896 A \* 4/2023

\* cited by examiner

Primary Examiner — Jeffrey C Pwu
Assistant Examiner — Mayasa A. Shaawat
(74) Attorney, Agent, or Firm — Fogarty LLP (57) ABSTRACT

According to embodiments of the present disclosure, a Security Protocol and Data Model (SPDM)-enabled device uses a device identity to provide, among other things, a SPDM-based firmware protection system and method that, upon execution by computer-readable instructions, receive, from a requesting device, a request to update the SPDM-enabled device with a software package, and obtain the software package from an online portal. The computer-readable instructions further encrypt the software package with an encryption key, encrypt the encryption key with a device identity certificate of the requesting device, and send the encrypted software package and encrypted encryption key to the requesting device.

19 Claims, 4 Drawing Sheets

SPDM-BASED FIRMWARE PROTECTION SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

Nowadays, software updates are typically made available on one or more download sites as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update. One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

According to embodiments of the present disclosure, a Security Protocol and Data Model (SPDM)-enabled device uses a device identity to provide, among other things, a SPDM-based firmware protection system and method that, upon execution by computer-readable instructions, receive, from a requesting device, a request to update the SPDM-enabled device with a software package, and obtain the software package from an online portal. The computer-readable instructions further encrypt the software package with an encryption key, encrypt the encryption key with a device identity certificate of the requesting device, and send the encrypted software package and encrypted encryption key to the requesting device.

According to another embodiment, a SPDM-based firmware protection method includes the steps of receiving, from a requesting device, a request to update a Security Protocol and Data Model (SPDM)-enabled device with a software package, obtaining the software package from an online portal, encrypting the software package with an encryption key, and encrypting the encryption key with a device identity certificate of the requesting device. The method may then send the encrypted software package and encrypted encryption key to the requesting device.

According to yet another embodiment, a computer program product may include computer-executable instructions to, when executed on an Information Handling System (IHS), receive, from a requesting device, a request to update the SPDM-enabled device with a software package, and obtain the software package from an online portal. The computer-readable instructions further encrypt the software package with an encryption key, encrypt the encryption key with a device identity certificate of the requesting device, and send the encrypted software package and encrypted encryption key to the requesting device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), and allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

To address and fix certain issues and/or for enhancing functionality of IHSs, software package updates are provided from time to time. In many cases, software package updates may be provided by an online support portal to customers by the IHS provider. For example, the DELL CORPORATION, which is headquartered in Round Rock, Texas, has an online support portal for distributing software packages that are packaged as Dell Update Packages (DUPs), which encapsulate software package updates into an easily managed package sometimes referred to as a firmware image or firmware blob. The DUPs typically include software updates in the form of firmware for the BMC as well as the other components of the server (e.g., IHS), for example PERCs, Network Interface Cards (NICs), and the like.

Conventionally, firmware is distributed with a vendor's (e.g., manufacturer) signature to verify the authenticity and integrity of the firmware. Nevertheless, with the BMC DUP images having only a signature to verify the authenticity, an adversary with appropriate tools can reverse engineer and disassemble the firmware to gather crucial information such as vendor Intellectual Property (IP) that may have been engineered into the firmware, program logic such as power and the thermal algorithms, details on the firmware sub-components and/or information that may be used to exploit any known or unknown vulnerabilities. For such reasons, several vendors of computing devices that may be updated from time to time (e.g., GPU vendors) do not allow third party support portals to distribute their firmware updates. Rather, the third party vendors often work directly with end customers to perform firmware updates, and often under a Non-Disclosure Agreement (NDA). They do this to ensure that the firmware image which would otherwise be part of the DUP will not be used for reverse engineering. One solution would be to encrypt the DUP using a generic key, which would need to be distributed to all entities that are going to implement the DUP. However, such an arrangement would incur key management issues as one cannot use the same public key to encrypt the DUP firmware image because it would likely encounter numerous security threats.

As will be described in detail herein below, embodiments of the present disclosure provide a system and method for SPDM-based firmware protection that uses SPDM-based device identity certificates from a requesting device to encrypt a random encryption key that is, in turn, used to encrypt the firmware image. When the requesting device (e.g., BMC) receives the encrypted image, it can use a private key corresponding to the device identity certificate to decrypt the firmware image thus alleviating security issues associated with the distribution of firmware images in an inherently insecure environment, such as the Internet.

Figure 1:
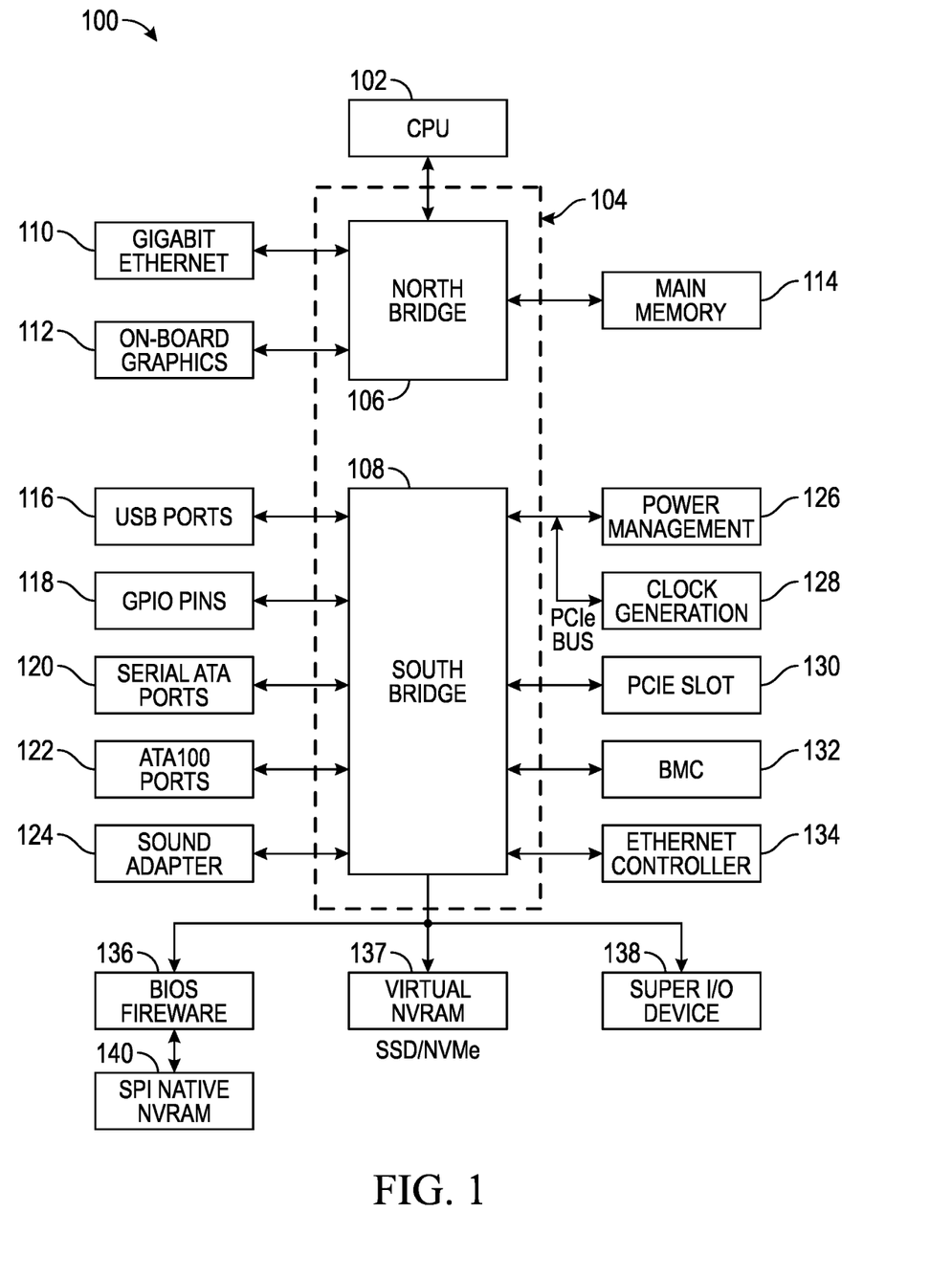
FIG. 1 shows an example of an Information Handling System (IHS) that may be configured to implement a system and method for SPDM-based firmware protection according to one embodiment of the present disclosure.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. Managed devices may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
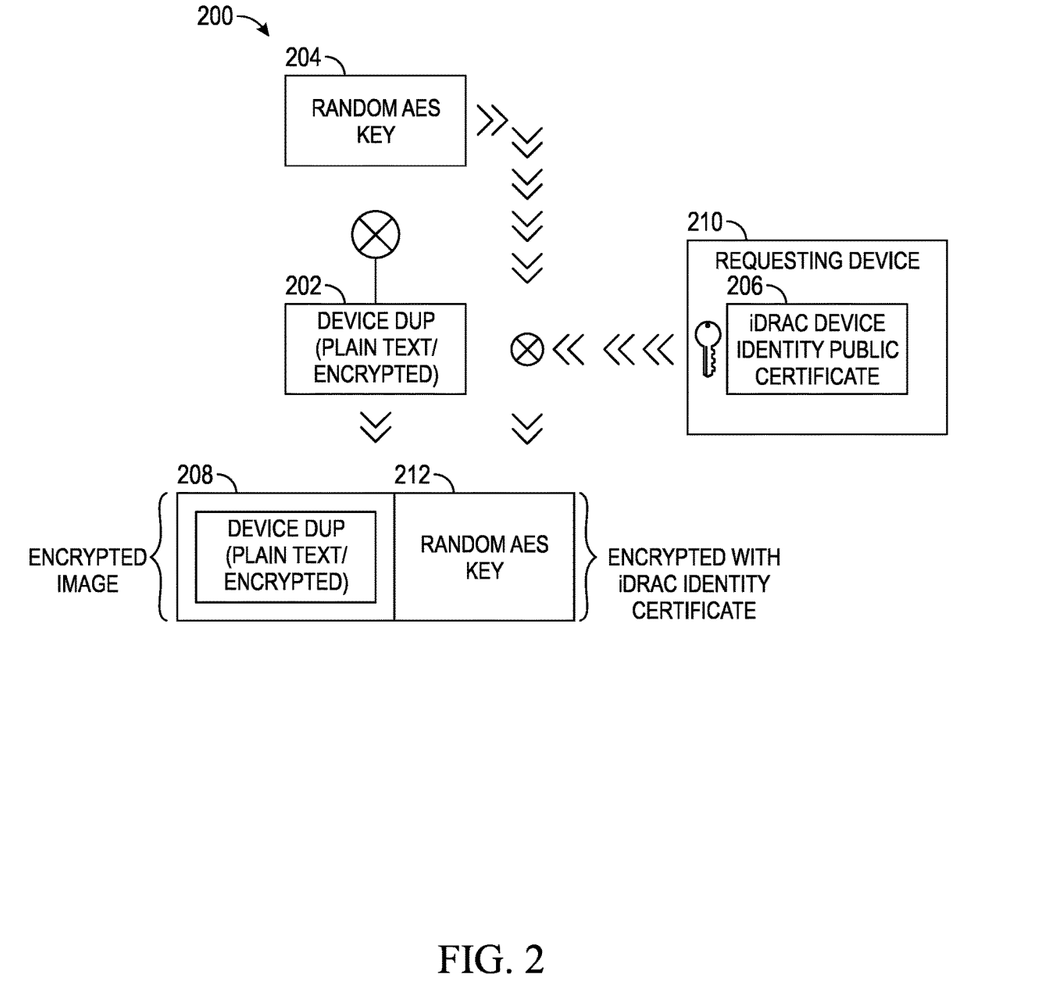
FIG. 2 is a diagram view illustrating several elements of an example SPDM-based firmware protection process that may be used to provide secure distribution firmware update images according to one embodiment of the present disclosure.

FIG. 2 is a diagram view illustrating several elements of an example SPDM-based firmware protection process 200 that may be used to provide secure distribution firmware update images according to one embodiment of the present disclosure. The SPDM-based firmware protection process 200 involves a software package 202, an encryption key 204, a device identity certificate 206 of a requesting device 210, an encrypted software package 208, and an encrypted encryption key 212. When the encrypted software package 208 and encrypted encryption key 212 are generated, they may be sent (e.g., as a single download package) to the requesting device 210 from the source of the software package, such as an online support portal that provides firmware updateable products to be deployed in the field.

The software package 202 may be any type that is distributed for download and installation on any computing device that receives and deploys software update image at an ongoing basis. In one embodiment, the software package 202 may include a firmware update package that is to be downloaded from an online support portal of a vendor of the computing device, and installed on a computing device at the customer's premises. The computing device that is to be updated with the software package 202 may include software updates to IHSs, such as personal computers (e.g., workstations, notebook computers, computing tablets, cellular telephones, etc.), as well as computing devices configured in those devices (e.g., NIC cards, GPUs, BIOS, PERC cards, etc.).

The SPDM-based firmware protection process 200 involves encrypting the software package 202 with the encryption key 204. In one embodiment, the encryption key 204 is a nonce random encryption key in that it is generated once, used to provide the SPDM-based firmware protection process described herein, and then discarded. The SPDM-based firmware protection process 200 further involves encrypting the encryption key 204 with the device identity certificate 206 of the requesting device 210. In one embodiment, the device identity certificate 206 is received from the requesting device 210 along the request for the software package 202. That is, when the requesting device 210 issues a request for the software package 202, it may append its device identity certificate 206 to the request. When the encrypted software package 208 and encrypted encryption key 212 are generated, they may be sent to the requesting device 210 as a single package (e.g., a data blob). In other embodiments, the encrypted software package 208 and encrypted encryption key 212 may be sent to the requesting device 210 separately. When the requesting device 210 receives the encrypted software package 208 and encrypted encryption key 212, it may use a private key corresponding to its own device identity certificate 206 to decrypt the encrypted encryption key 204 that in turn, may be used to decrypt the software package 202.

Figure 3:
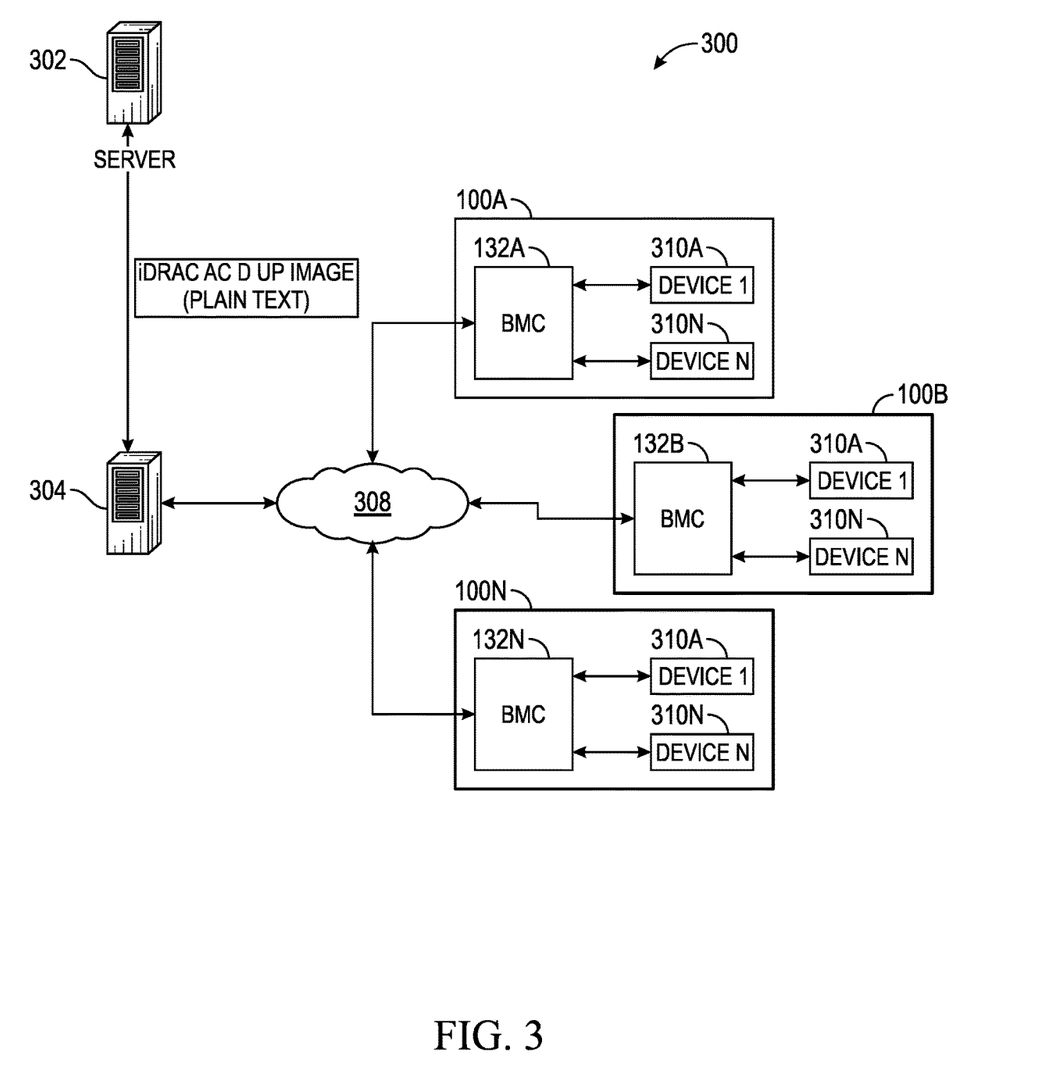
FIG. 3 illustrates an example SPDM-based firmware protection system that may use the SPDM-based firmware protection process to provide secure distribution of firmware update images according to one embodiment of the present disclosure.

FIG. 3 illustrates an example SPDM-based firmware protection system 300 that may use the SPDM-based firmware protection process 200 to provide secure distribution of firmware update images according to one embodiment of the present disclosure. The system 300 includes a software package source 302 in communication with a firmware service 304 that is in turn, in communication with one or more BMCs 132a-n (collectively 132) of respective IHSs 100a-n (collectively 100) via communication network 308, such as the Internet. Each IHS 100a-n may include one or more devices 310a-n (collectively 310) that may be updated with a software package 202 provided by the software package source 302. In one embodiment, the firmware update source 302 and software service 304 may each be an IHS 100 such as described above with reference to the IHS 100 of FIG. 1 and configured with executable logic for performing the various features described herein.

In one embodiment, the IHSs 100 may be configured in a cluster or a data center that is administered by a user (e.g., administrator). Moreover, the firmware service 304 may be configured internally or externally to the cluster or data center that the IHSs 100 are configured in. For example, the firmware service 304 may be configured in one or more servers within the data center. Alternatively, the firmware service 304 may be configured externally to the data center, such as a regional support site managed by support representatives managing a certain geographical region. Additionally, it is contemplated in some embodiments, that the firmware server 304 and the IHS 100 configured with the device 310 to be updated are the same. That is, the IHS 100 configured with the device 310 to be updated may function as the firmware service 304. Additionally, although the firmware server 304 is shown with a direct communication link to the software package source 302, it should be understood that the firmware server 304 may form a communication link through the network 308 without departing from the spirit and scope of the present disclosure.

Figure 4:
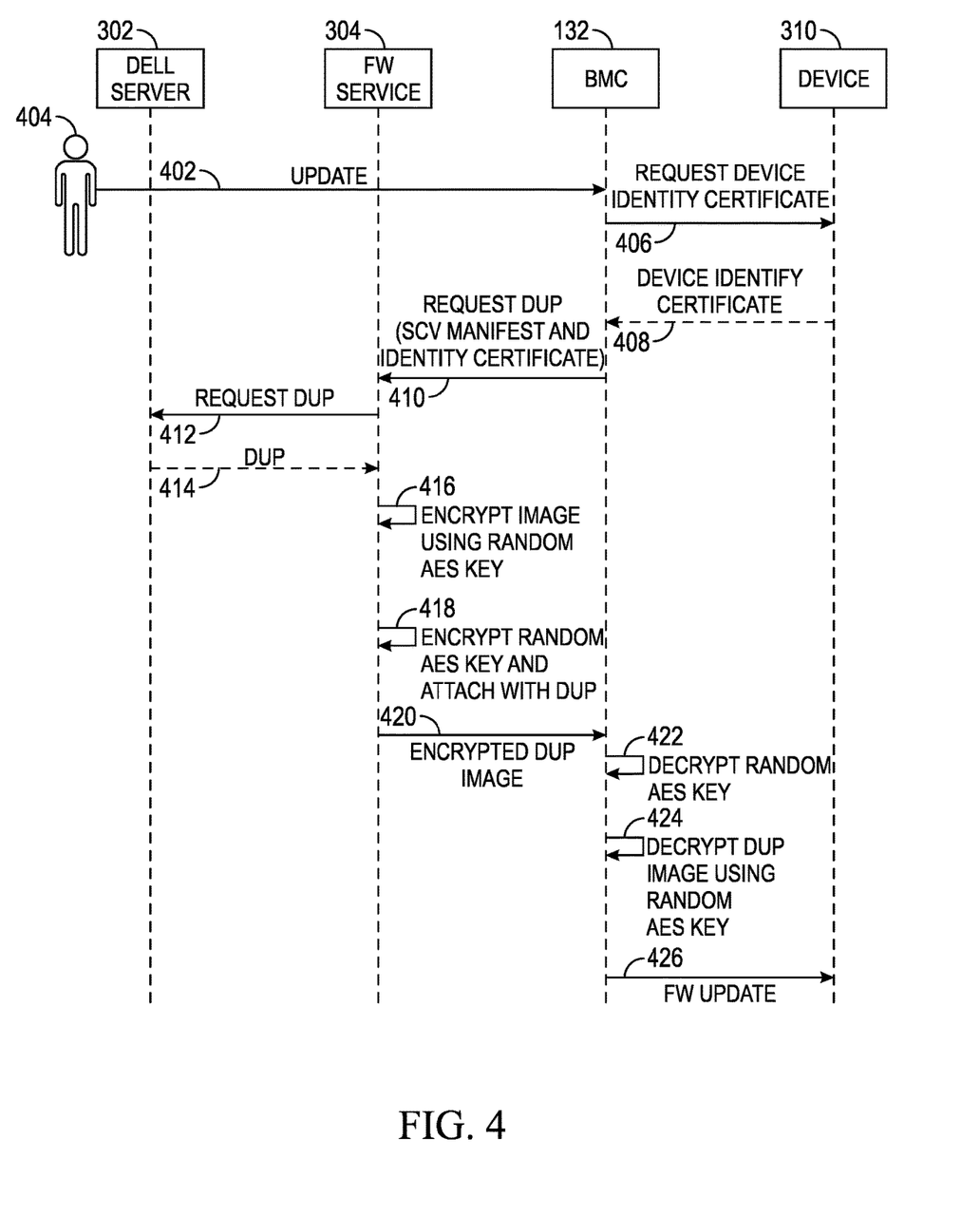
FIG. 4 illustrates an example SPDM-based firmware protection method that may be used to provide secure distribution firmware update images according to one embodiment of the present disclosure.

FIG. 4 illustrates an example SPDM-based firmware protection method 400 that may be used to provide secure distribution firmware update images according to one embodiment of the present disclosure. The method 400 may be performed at any suitable time, such as when a device 310 is to be updated with new firmware or to be initially deployed with its first firmware image. Additionally or alternatively, the method 400 may be performed at least in part, by the SPDM-based firmware protection system 300 as described above with reference to FIG. 3.

Initially at step 402, a user 404 submits a request to have a firmware package 202 installed on a device 310. In one embodiment, the request is submitted to the BMC 132 that is configured in the same IHS 100 that the device 310 is configured in. Thereafter at step 406, the BMC 132 issues a request for a device identity certificate 206 from the device 310, and at step 408, the device 310 responds by sending the device identity certificate 206 to the BMC 132. In one embodiment, the device identity certificate 206 is one conforming to a data structure as specified by the SPDM specification. For example, the device identity certificate 206 may be the certificate stored in slot 0 of the SPDM-based data structure.

At step 410, the BMC 132 issues a request to the firmware service 304 in which the request includes the device identity certificate 206 obtained from the device 310. In one embodiment, the request may include a Secure Component Verification (SCV) manifest. In one embodiment, the firmware service 304 may be configured locally with respect to the BMC 132 (e.g., in the same data center), or remotely with respect to the BMC 132 (e.g., communicates via communication network 308). In another embodiment, the firmware service 304 may be the same IHS that the BMC 132 is configured in. At step 412, the firmware service 304 issues a request for the software package 202 specified by the request received in step 410. For example, the type of software package 202 (e.g., make, model, software version) may be specified in the SCV manifest. The software package source 302 responds by sending the requested software package 202 to the firmware service 304 at step 414.

Having received the software package 202, the firmware service 304 encrypts the software package 202 using the encryption key 204 at step 416. In one embodiment, the encryption key 204 may be a nonce encryption key that is used once, then discarded. Thereafter at step 418, the software service 304 encrypts the encryption key 204 with the device identity certificate 206 of the device 310, and at step 420, sends the encrypted software package 208 along with the encrypted encryption key 212 to the BMC 132.

The BMC 132, having the device identity certificate 206 it received at step 408, uses a private key corresponding to the device identity certificate 206 to decrypt the encrypted encryption key 212 to obtain the encryption key 204 at step 422. Thereafter at step 424, the BMC 132 uses the decrypted encryption key 204 to decrypt the software package 202. The BMC 132 then applies the firmware package 202 to the device 310 at step 426. That is, the BMC 132 installs the decrypted software package 202 on the device 310.

The SPDM-based firmware protection method 400 described above may be performed each time a software package 202 is to be installed or updated on a device 310. Nevertheless, when use of the SPDM-based firmware protection method 400 is no longer needed or desired, the process ends.

Although FIG. 4 describes an example method 400 that may be performed to provide secure distribution firmware update images, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and Including) and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Security Protocol and Data Model (SPDM)-enabled device conforming to a SPDM specification; and
at least one memory coupled to at least one processor, the at least one memory having
program instructions stored thereon that, upon execution by the at least one processor, cause the IHS to:
receive, from a requesting device, a request to update the SPDM-enabled device
with a software package;
obtain the software package from an online portal;
encrypt the software package with an encryption key;
encrypt the encryption key with a device identity certificate of the requesting device; and
send the encrypted software package and encrypted encryption key to the requesting device;
wherein the request includes the device identity certificate, and wherein the device identity certificate conforms to a data structure as specified by the SPDM specification.

2. The IHS of claim 1, wherein the requesting device comprises a Baseboard Management Controller (BMC) configured in the IHS.

3. The IHS of claim 2, wherein the program instructions, upon execution, further cause the IHS to:
receive the encrypted software package and encrypted encryption key;
decrypt the encryption key with a private key corresponding to the device identity certificate of the requesting device;
decrypt the software package with the encryption key; and
update the SPDM-enabled device with the software package.

4. The IHS of claim 3, wherein the instructions are performed in a data center, and the BMC is located in the data center.

5. The IHS of claim 3, wherein the instructions are performed in the same IHS that the BMC is configured in.

6. The IHS of claim 1, wherein the program instructions, upon execution, further cause the IHS to obtain the device identity certificate from slot 0 of the data structure.

7. The IHS of claim 1, wherein the encryption key comprises a random encryption key.

8. The IHS of claim 1, wherein the online portal is managed by a vendor of the IHS.

9. A SPDM-based firmware protection method comprising:
- receiving, from a requesting device, a request to update a Security Protocol and Data
  Model (SPDM)-enabled device with a software package, the SPDM-enabled
  device conforming to a SPDM specification;
- obtaining the software package from an online portal;
- encrypting the software package with an encryption key;
- encrypting the encryption key with a device identity certificate of the requesting device; and
- sending the encrypted software package and encrypted encryption key to the requesting device;
- wherein the request includes the device identity certificate, and wherein the device identity certificate conforms to a data structure as specified by the SPDM specification.

10. The SPDM-based firmware protection method of claim 9, wherein the requesting device comprises a Baseboard Management Controller (BMC) configured in an Information Handling System (IHS), and wherein the SPDM-based firmware protection method further comprises:
- receiving, by the BMC, the encrypted software package and encrypted encryption key;
- decrypting, by the BMC, the encryption key with the device identity certificate of the requesting device;
- decrypting, by the BMC, the software package with the encryption key; and
- updating, by the BMC, the SPDM-enabled device with the software package.

11. The SPDM-based firmware protection method of claim 10, performing the instructions wherein the SPDM-based firmware protection method is performed in a data center, and the BMC is located in the data center.

12. The SPDM-based firmware protection method of claim 10, further comprising performing the instructions wherein the SPDM-based firmware protection method is performed in the same IHS that the BMC is configured in.

13. The SPDM-based firmware protection method of claim 10, wherein the request includes the device identity certificate, wherein the device identity certificate conforms to a data structure as specified by the SPDM specification, and wherein the program instructions, upon execution, further cause the IHS to obtain comprising obtaining the device identity certificate from slot 0 of the data structure.

14. The SPDM-based firmware protection method of claim 9, wherein the encryption key comprises a random encryption key.

15. The SPDM-based firmware protection method of claim 10, wherein the online portal is managed by a vendor of the IHS.

16. A computer program product comprising a computer readable storage medium having program instructions stored thereon that, upon execution by an Information Handling System (IHS), cause the IHS to:
- receive, from a requesting device, a request to update a Security Protocol and Data Model (SPDM)-enabled device with a software package, the SPDM-enabled device conforming to a SPDM specification;
- obtain the software package from an online portal;
- encrypt the software package with an encryption key;
- encrypt the encryption key with a device identity certificate of the requesting device; and
- send the encrypted software package and encrypted encryption key to the requesting device;
- wherein the request includes the device identity certificate, and wherein the device identity certificate conforms to a data structure as specified by the SPDM specification.

17. The computer program product of claim 16, wherein the requesting device comprises a Baseboard Management Controller (BMC) configured in the IHS, and wherein the program instructions, upon execution, further cause each of the BMC to:
- receive the encrypted software package and encrypted encryption key;
- decrypt the encryption key with a private key corresponding to the device identity certificate of the requesting device;
- decrypt the software package with the encryption key; and
- update the SPDM-enabled device with the software package.

18. The computer program product of claim 17, wherein the instructions are performed in a data center, and the BMC is located in the data center.

19. The computer program product of claim 17, wherein the instructions are performed in the same IHS that the BMC is configured in.

* * * * *

UNITED STATES PATENT AND TRADEMARK OFFICE
CERTIFICATE OF CORRECTION

PATENT NO. : 12,457,098 B2
APPLICATION NO. : 18/174137
DATED : October 28, 2025
INVENTOR(S) : Shinose Abdul Rahiman et al.

Page 1 of 1

It is certified that error appears in the above-identified patent and that said Letters Patent is hereby corrected as shown below:

In the Claims

In Column 11, Line 46-47, Claim 11 delete "claim 10, performing the instructions wherein the SPDM-based firmware protection method is performed in a data" and insert -- claim 10, wherein the SPDM-based firmware protection method is performed in a data -- therefor.

In Column 11, Line 50-51, Claim 12 delete "claim 10, further comprising performing the instructions wherein the SPDM-based firmware protection method is" and insert -- claim 10, wherein the SPDM-based firmware protection method is -- therefor.

In Column 12, Line 2-6, Claim 13 delete "claim 10, wherein the request includes the device identity certificate, wherein the device identity certificate conforms to a data structure as specified by the SPDM specification, and wherein the program instructions, upon execution, further cause the IHS to obtain comprising obtaining the device" and insert -- claim 10, further comprising obtaining the device -- therefor.

In Column 12, Line 36-37, Claim 17 delete "program instructions, upon execution, further cause each of the BMC to:" and insert -- program instructions, upon execution, cause the BMC to: -- therefor.

Signed and Sealed this
Sixteenth Day of December, 2025

John A. Squires
*Director of the United States Patent and Trademark Office*